United States Patent
Katoh et al.

(10) Patent No.: US 9,288,344 B2
(45) Date of Patent: Mar. 15, 2016

(54) IMAGE PROCESSING APPARATUS, IMAGE PROCESSING METHOD, AND NON-TRANSITORY COMPUTER-READABLE MEDIUM

(75) Inventors: Hiroyuki Katoh, Kanagawa (JP); Hidenori Shindo, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 205 days.

(21) Appl. No.: 13/489,842

(22) Filed: Jun. 6, 2012

(65) Prior Publication Data

US 2013/0003116 A1    Jan. 3, 2013

(30) Foreign Application Priority Data

Jul. 1, 2011    (JP) .................................. 2011-147590

(51) Int. Cl.
*H04N 1/00* (2006.01)
*H04N 1/333* (2006.01)
*G06F 3/12* (2006.01)

(52) U.S. Cl.
CPC ....... *H04N 1/00347* (2013.01); *H04N 1/33307* (2013.01); *G06F 3/1211* (2013.01); *G06F 3/1245* (2013.01); *G06F 3/1247* (2013.01); *G06F 3/1291* (2013.01); *H04N 2201/0039* (2013.01); *H04N 2201/0094* (2013.01); *H04N 2201/33357* (2013.01); *H04N 2201/33378* (2013.01)

(58) Field of Classification Search
CPC .. H04N 1/33307; G06F 3/1245; G06F 3/1247
See application file for complete search history.

(56) References Cited

U.S. PATENT DOCUMENTS

| | | | |
|---|---|---|---|
| 7,515,293 B2 | 4/2009 | Kizaki et al. | |
| 2004/0114171 A1 | 6/2004 | Shindoh et al. | |
| 2004/0136022 A1 | 7/2004 | Kizaki et al. | |
| 2008/0068657 A1* | 3/2008 | Uchida et al. | 358/1.16 |
| 2009/0204766 A1* | 8/2009 | Jacobi et al. | 711/133 |

FOREIGN PATENT DOCUMENTS

JP    2008073895 A    4/2008

* cited by examiner

*Primary Examiner* — Mohammad Ghayour
*Assistant Examiner* — Lennin Rodriguezgonzalez
(74) *Attorney, Agent, or Firm* — Harness, Dickey & Pierce, P.L.C.

(57) ABSTRACT

A control unit in an image processing apparatus performs control as follows. The storage unit stores image data in a first format and image data in a second format for a particular application, into which the image data in the first format is converted by the converting unit, at image input. When the image data is to be used by a first application which is same as the particular application in a first apparatus of the same model as the image processing apparatus, a communication unit transfers the stored image data in the second format to the first apparatus. When the image data is to be used by a second application different from the particular application, the communication unit transfers image data in a format for the second application, into which the converting unit converts the stored image data in the first format, to the first apparatus.

11 Claims, 10 Drawing Sheets

| APPLICATION | ORIGINAL FORMAT | CONVERTED FORMAT |
|---|---|---|
| COPIER | CCD: RGB<br>8 BIT PER COLOR | COMPRESSED TO 2-BIT CMYK (NFC1) |
| | | COMPRESSED TO 2-BIT CMYK (NFC1+HAIC) |
| FACSIMILE | CCD: RGB<br>8 BIT PER COLOR | 1-BIT CMYK (MH-COMPRESSED) |
| | | 1-BIT CMYK (MR-COMPRESSED) |
| | | 1-BIT CMYK (MMR-COMPRESSED) |
| | | 1-BIT CMYK (JBIG-COMPRESSED) |
| SCANNER | CCD: RGB<br>8 BIT PER COLOR | 1-BIT CMYK (UNCOMPRESSED) |
| | | 1-BIT CMYK (MH-COMPRESSED) |
| | | 1-BIT CMYK (MR-COMPRESSED) |
| | | 1-BIT CMYK (MMR-COMPRESSED) |
| | | 1-BIT CMYK (JBIG-COMPRESSED) |
| | | 8-BIT RGB (UNCOMPRESSED) |
| | | 8-BIT RGB (JPEG-COMPRESSED) |
| | | 8-BIT RGB (JPEG2000-COMPRESSED) |
| | | 8-BIT RGB (COMPRESSED FOR HIGH-COMPRESSION PDF) |
| | | 8-BIT RGB (COMPRESSED FOR SEARCHABLE PDF) |

NOTE: NFC1 AND HAIC ARE ORIGINAL COMPRESSION SCHEMES

ID_PROCESSING APPARATUS, IMAGE
PROCESSING METHOD, AND
NON-TRANSITORY COMPUTER-READABLE
MEDIUM

CROSS-REFERENCE TO RELATED APPLICATIONS

The present application claims priority to and incorporates by reference the entire contents of Japanese Patent Application No. 2011-147590 filed in Japan on Jul. 1, 2011.

BACKGROUND OF THE INVENTION

1. Field of the Invention

The present invention relates to an image processing apparatus, an image processing method, and a non-transitory computer-readable medium.

2. Description of the Related Art

Each of application programs (hereinafter, "applications") running on electrophotographic image forming apparatuses conventionally handles image data in a format that is optimal for the applications in consideration of productivity and image quality to make full use of features, which generally vary among the applications, of the application. Furthermore, printing units of image forming apparatuses of a same model vary individually. For this reason, image data values are adjusted to make printouts of the image forming apparatuses identical in image quality.

There has been a growth in recent multifunction peripherals (MFPs) that utilize a document (or an image) of an application in various forms. A known technique for this utilization involves format conversion between application-specific formats. An example of the technique is disclosed in Japanese Patent Application Laid-open No. 2008-73895. According to this technique, an input image is converted into a universal format and thereafter subjected to further format conversion according to an intended use of the input image to improve a processing procedure for converting the input image into an output image.

However, converting image data from one format into another format that is application-specific and model-dependent arises problems. The problems are that an image of converted image data is degraded relative to an original image because the converted image data differs from original image data in color reproducibility and amount of data, and that processing time for the conversion affects subsequent job processing (i.e., has an impact on productivity).

SUMMARY OF THE INVENTION

It is an object of the present invention to at least partially solve the problems in the conventional technology.

According to an aspect of the present invention, there is provided an image processing apparatus including: a plurality of applications each performing predetermined image processing; a storage unit for storing image data in a first format that is model-independent and application-independent and image data in a second format that is model-dependent and application-dependent; a converting unit that converts the image data in the first format into the image data in the second format; a communication unit for exchanging image data with another image processing apparatus; and a control unit that performs control such that the storage unit stores the image data in the first format and the image data converted by the converting unit into the second format at image input, the second format being for a particular application of the plurality of applications, when the image data is to be used by a first application in a first apparatus which is the other image processing apparatus of a same model as the image processing apparatus, the communication unit transfers the stored image data in the second format for the particular application to the first apparatus, the first application being same as the particular application, and when the image data is to be used by a second application in the first apparatus, the converting unit converts the stored image data in the first format into image data in a format for the second application and the communication unit transfers the converted image data to the first apparatus, the second application being different from the particular application.

According to another aspect of the present invention, there is provided an image processing method to be performed by an image processing apparatus that includes a plurality of applications each executing predetermined image processing, a storage unit for storing image data in a first format that is model-independent and application-independent and image data in a second format that is model-dependent and application-dependent, a converting unit that converts the image data in the first format into the image data in the second format, a communication unit for exchanging image data with another image processing apparatus, and a control unit, the image processing method including: controlling, by the control unit, such that the storage unit stores the image data in the first format and the image data converted by the converting unit into the second format at image input, the second format being for a particular application of the plurality of applications, when the image data is to be used by a first application in a first apparatus which is the other image processing apparatus of a same model as the image processing apparatus, the communication unit transfers the stored image data in the second format for the particular application to the first apparatus, the first application being same as the particular application, and when the image data is to be used by a second application in the first apparatus, the converting unit converts the stored image data in the first format into image data in a format for the second application and the communication unit transfers the converted image data to the first apparatus, the second application being different from the particular application.

According to still another aspect of the present invention, there is provided A non-transitory computer-readable medium having computer readable program codes recorded thereon, the program codes configured to perform an image processing method when executed by a processor of an image processing apparatus, the image processing apparatus including a plurality of applications each executing predetermined image processing, a storage unit for storing image data in a first format that is model-independent and application-independent and image data in a second format that is model-dependent and application-dependent, a converting unit that converts the image data in the first format into the image data in the second format, a communication unit for exchanging image data with another image processing apparatus, and a control unit, the image processing method including: controlling, by the control unit, such that the storage unit stores the image data in the first format and the image data converted by the converting unit into the second format at image input, the second format being for a particular application of the plurality of applications, when the image data is to be used by a first application in a first apparatus which is the other image processing apparatus of a same model as the image processing apparatus, the communication unit transfers the stored image data in the second format for the particular application to the first apparatus, the first application being same as the particular application, and when the image data is to be used by a second application in the first apparatus, the converting unit converts the stored image data in the first format into image data in a format for the second application and the communication unit transfers the converted image data to the first apparatus, the second application being different from the particular application.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
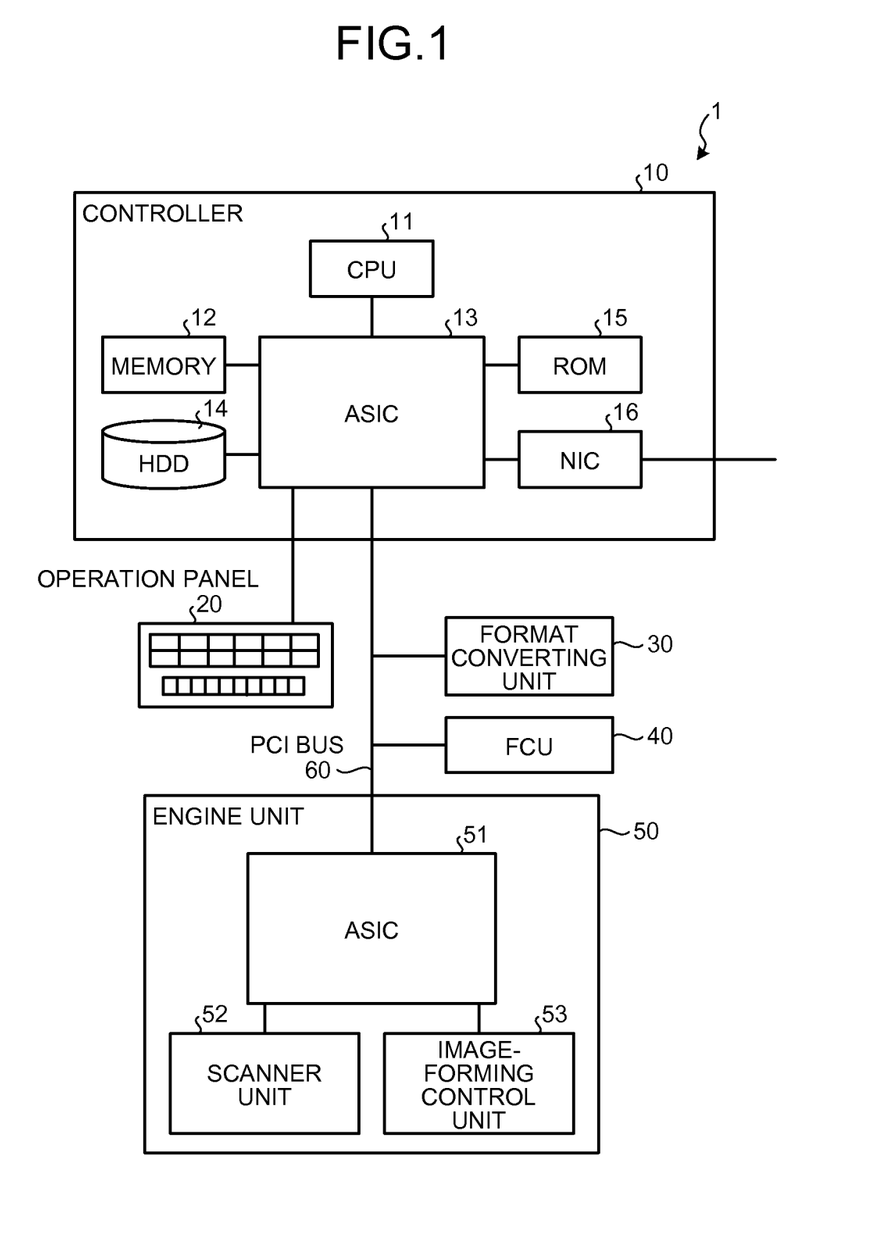
FIG. 1 is a block diagram illustrating a hardware configuration of a multifunction apparatus which is an embodiment of an image processing apparatus according to the present invention.

The configuration of a multifunction apparatus which is an embodiment of an image processing apparatus according to the present invention is described first with reference to FIG. 1. FIG. 1 is a block diagram illustrating a hardware configuration of the multifunction apparatus.

A multifunction apparatus 1 includes a controller 10, an operation panel 20, a format converting unit 30, a facsimile control unit (FCU) 40, and an engine unit 50.

The controller 10 includes a central processing unit (CPU) 11, a memory 12, an application-specific integrated circuit (ASIC) 13, a hard disk drive (HDD) 14, a read only memory (ROM) 15, and a network interface card (NIC) 16 that are connected to one another via the ASIC 13.

The CPU 11 reads out software including various applications stored in the ROM 15 and the HDD 14, loads the software into the memory 12 via the ASIC 13, and executes the software, thereby controlling the entire multifunction apparatus 1, and also implementing various functions and performing various processing procedures. The processing procedures will be described later. The CPU 11 also carries out communications with equipment that is externally connected to the multifunction apparatus 1 over a network such as a local area network (LAN) via the ASIC 13 and the NIC 16. The NIC 16 is an interface device for connecting the multifunction apparatus 1 to the network.

The ROM 15 stores an initial program that is to be executed by the multifunction apparatus 1 at startup and the like. The HDD 14 stores not only the software such as the various applications but also image data, document data, font data, and the like. The memory 12 is used as a rendering memory of the multifunction apparatus 1 and also as a buffer for temporarily storing various types of data pieces. The various applications stored in the memory 12 include programs each for causing the multifunction apparatus 1 to implement a corresponding one of various functions including a copier function, a scanner function, and a facsimile function.

The operation panel 20 is connected to the ASIC 13 of the controller 10. The format converting unit 30, the FCU 40, and the engine unit 50 are connected to the ASIC 13 of the controller 10 via a peripheral component interconnect (PCI) bus 60.

The engine unit 50 includes an ASIC 51, a scanner unit 52, and an image-forming control unit 53. The ASIC 51 is an image-processing-specific IC having hardware component for image processing. The scanner unit 52 scans a document to generate document image data. The image-forming control unit 53 controls an image forming process which is an electrophotographic process, for example, to receive image data fed from the ASIC 51 and transfer a multiple-color toner image that is based on the image data onto a recording sheet.

The operation panel 20 receives an operation input from a user and provides display for the user. The format converting unit 30 converts image data from a universal format into an application-specific format for each of the applications. The FCU 40 controls facsimile communications. The format converting unit 30 may be configured as a hardware device dedicated to the format conversion or, alternatively, may be implemented by the CPU 11 of the controller 10 by executing format conversion processing.

Basic processing procedures for copying, scanning, and faxing in the multifunction apparatus 1 are briefly described below.

Figure 2:
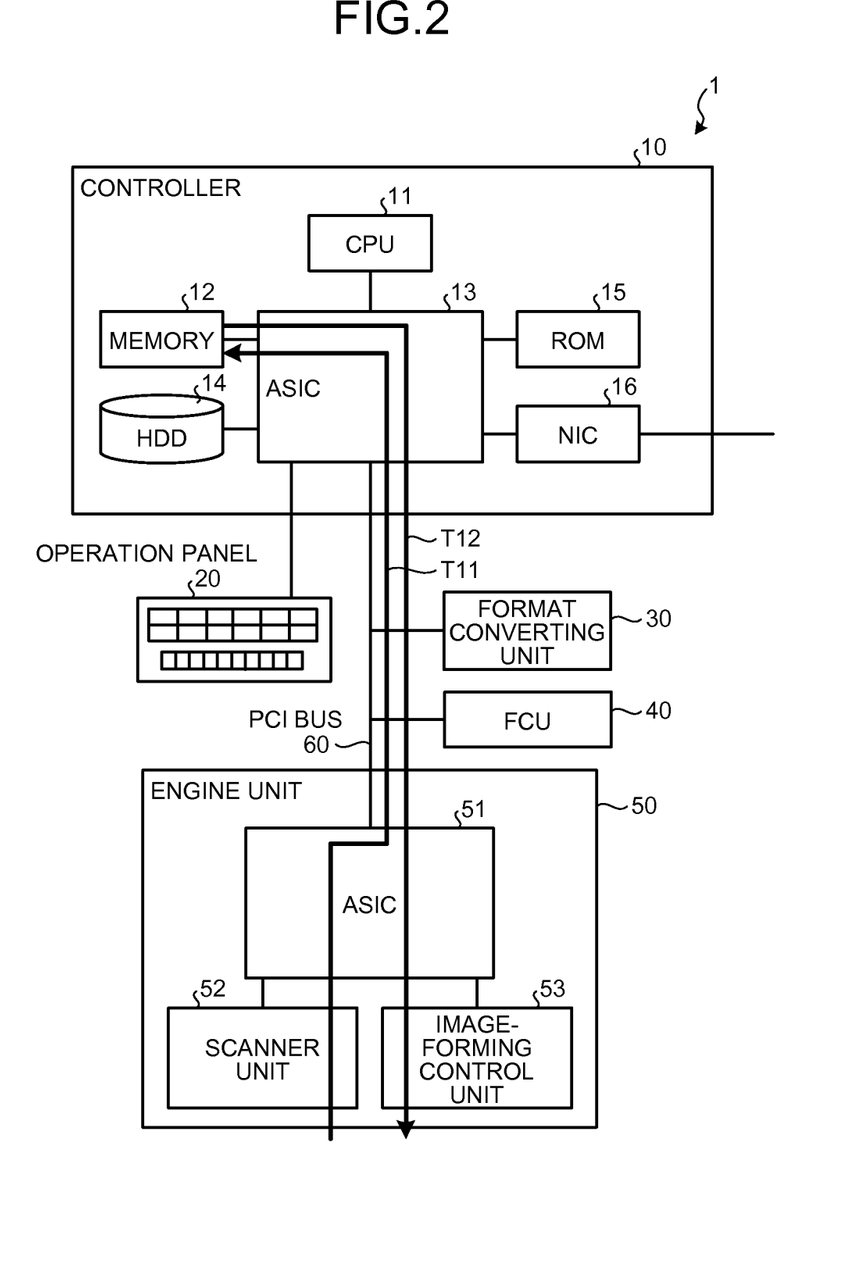
FIG. 2 is a flowchart illustrating a processing procedure for copying in the multifunction apparatus according to the embodiment.

FIG. 2 illustrates a processing procedure for copying in the multifunction apparatus 1. When copying is started by a user by manipulating the operation panel 20, the processing procedure described below is performed under control of the CPU 11.

(1) Image data (digital data) is obtained by the scanner unit 52 by scanning a to-be-copied document and accumulated in the memory 12 via the ASIC 51 and the ASIC 13 (T11).

(2) Thereafter, the image data is transferred from the memory 12 via the ASIC 13 and the ASIC 51 to the image-forming control unit 53. The image-forming control unit 53 prints the image data on a sheet (T12).

Figure 3:
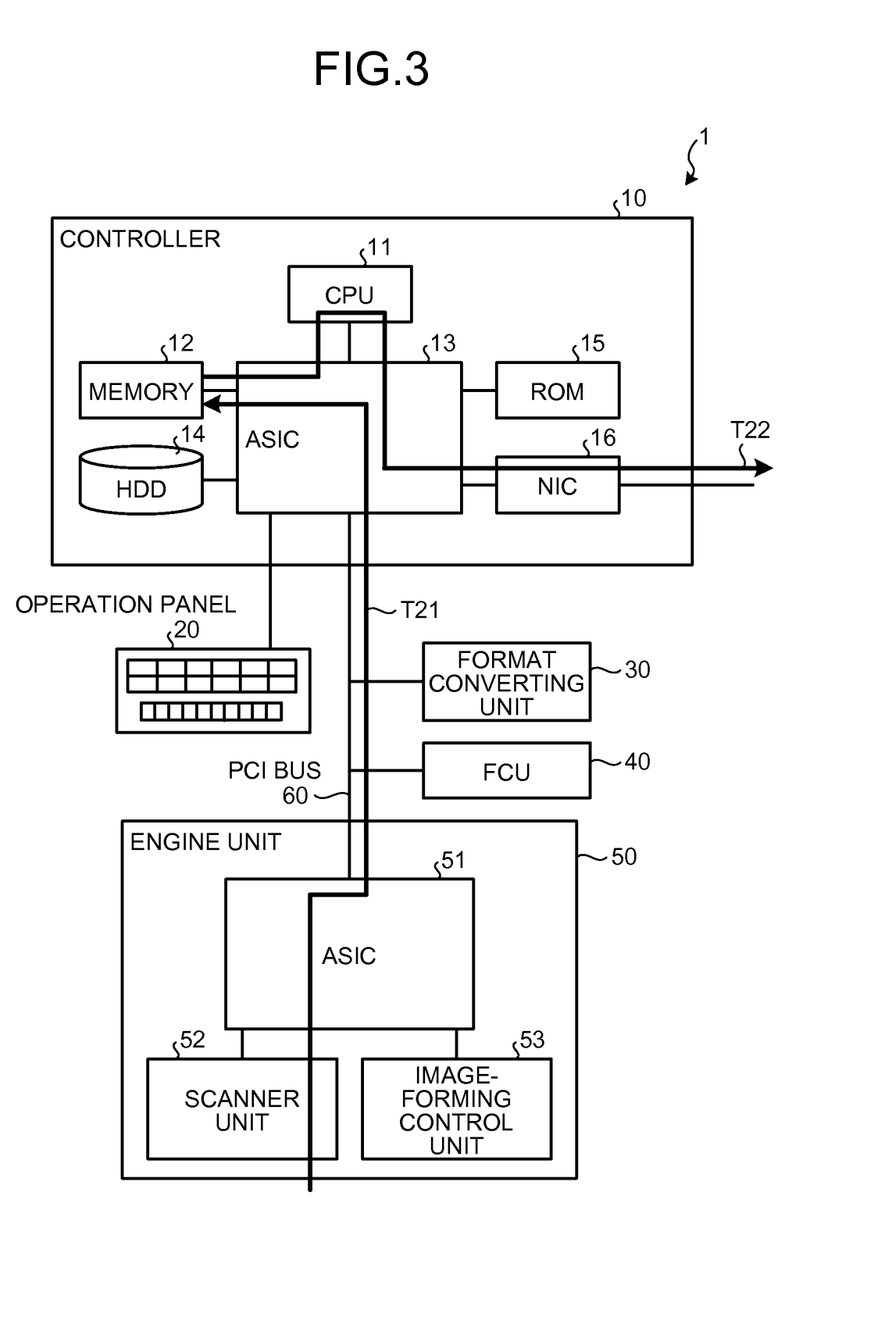
FIG. 3 is a flowchart illustrating a processing procedure for document scanning in the multifunction apparatus according to the embodiment.

FIG. 3 illustrates a processing procedure for document scanning. The procedure described below is performed under control of the CPU 11 when document scanning is started by a user that has designated a destination host, to which the image data obtained by scanning a document is to be transferred, by manipulating the operation panel 20.

(1) Image data (digital data) is obtained by the scanner unit 52 by scanning a document and accumulated in the memory 12 via the ASIC 51 and the ASIC 13 (T21).

(2) Thereafter, the image data is sent from the memory 12 via the CPU 11 and the ASIC 13 to the NIC 16, from which the image data is transferred to the destination host (T22).

Faxing

Figure 4:
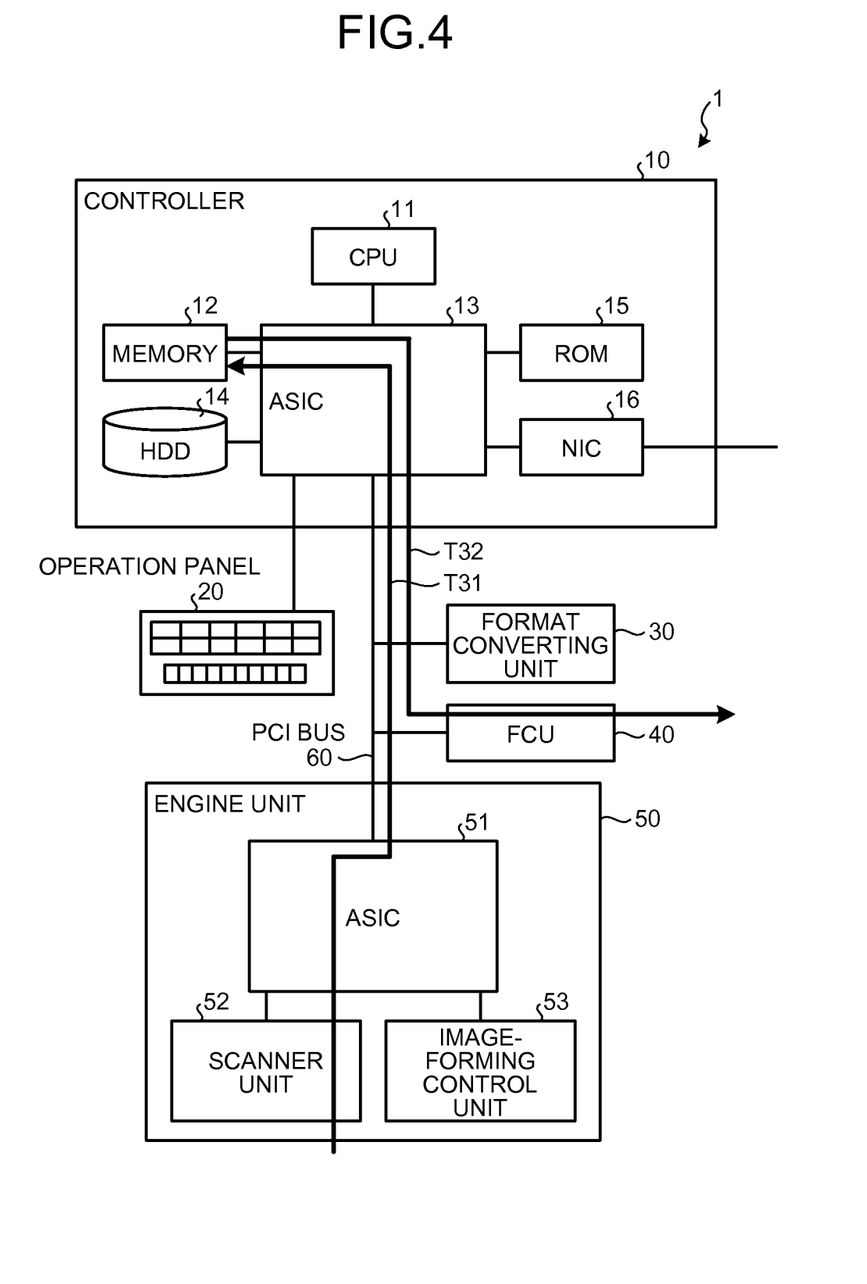
FIG. 4 is a flowchart illustrating a processing procedure for faxing in the multifunction apparatus according to the embodiment.

FIG. 4 illustrates a processing procedure for faxing. The procedure described below is performed under control of the CPU 11 when faxing is started by a user that has designated a destination facsimile, to which image data obtained by scanning a document is to be transferred, by manipulating the operation panel 20.

(1) Image data (digital data) is obtained by the scanner unit 52 by scanning a document and accumulated in the memory 12 via the ASIC 51 and the ASIC 13 (T31).

(2) Thereafter, the image data is sent from the memory 12 via the ASIC 13 to the FCU 40, from which the image data is transferred to the destination facsimile having been designated (T32).

In the processing procedures illustrated in FIGS. 2, 3, and 4, the image data obtained by the scanner unit 52 by scanning a document is conventionally converted in the ASIC 51 into an image format (specific format) that depends on an application when the image data is transferred to the memory 12.

Figure 5:
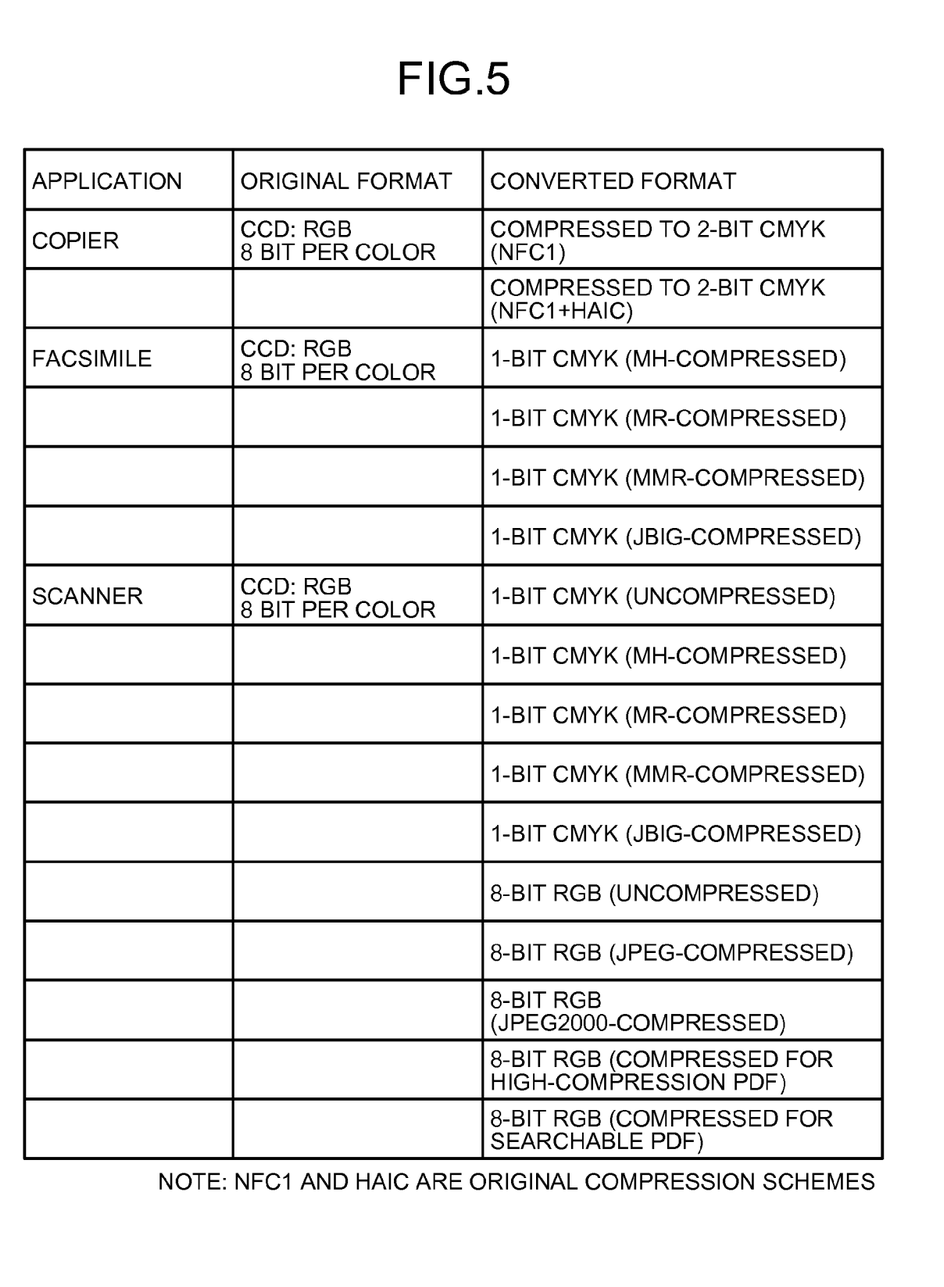
FIG. 5 is diagram illustrating an example of original formats and converted formats in the multifunction apparatus according to the embodiment.

FIG. 5 illustrates an example of original formats and converted formats conversion therebetween is performed in the ASIC 51. An amount of data obtained by scanning by the scanner unit 52 is large. Accordingly, the data amount has conventionally been reduced according to image quality that depends on each application, thereby causing the data to fit to performance and productivity of hardware. However, speed-ups in recent years have made it possible to input data unchanged from an RGB format. However, it is necessary to strike balance between image quality and processing time because an increase in data amount can lead to an increase in data processing time.

Meanwhile, RGB image data is converted into CMYK image data so that the CMYK image data is transmitted to the image-forming control unit 53 because the image-forming control unit 53 performs printing in CMYK. However, converting the image data that is stored as RGB image data into a specific format (e.g., a format for copying) each time the image data is output decreases productivity. Accordingly, in the embodiment, format conversion is performed when an image is input by document scanning or the like so that productivity equal to that achieved with a conventional technique can be achieved. Outline of operations according to the embodiment is described below (see FIG. 6).

Figure 6:
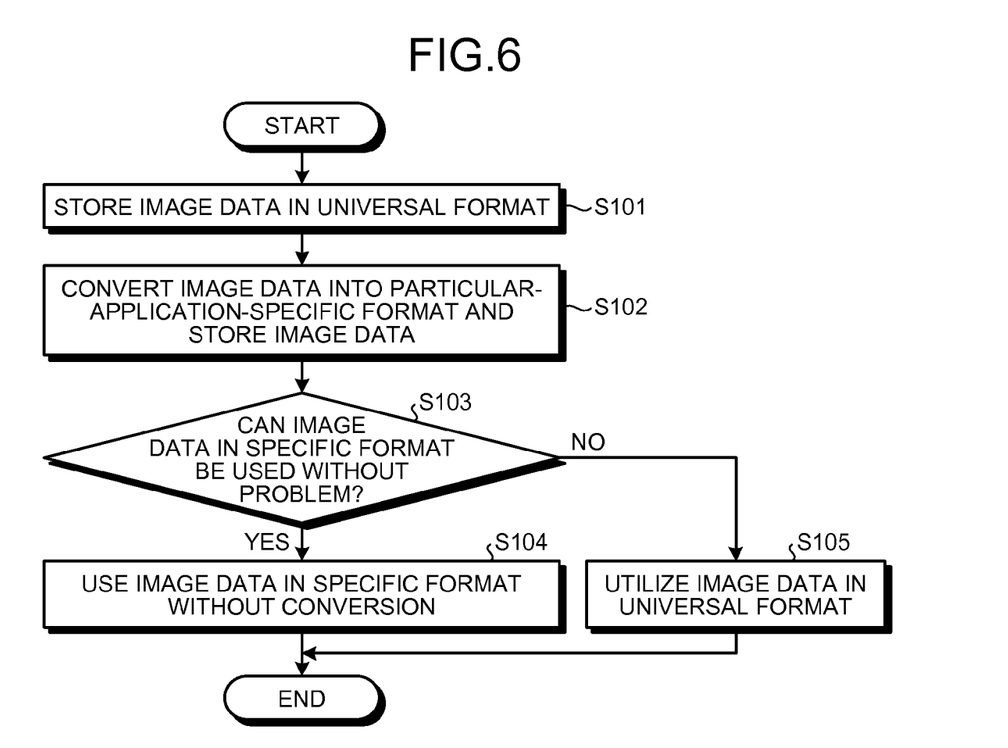
FIG. 6 is a flowchart illustrating an outline of operations that characterize the multifunction apparatus according to the embodiment.

At image input (i.e., when image data is obtained by scanning by the scanner unit 52 or received from a host such as a personal computer (PC)), the image data is stored in the HDD 14 in an universal format (for example, unchanged from the RGB format) (Step S101).

While the image input is made, conversion of the image data into a format that is specific to a particular application is also performed, and the converted image data is stored in the HDD 14 (Step S102).

Processing is performed as follows when the stored image data is to be transmitted to another apparatus connected to the multifunction apparatus 1 over the network or when the image data is to be used by another application (other than the particular application) of the applications of the multifunction apparatus 1. As a matter of course, the stored image data in the specific format is to be used when the image data is used by the particular application.

Figure 7:
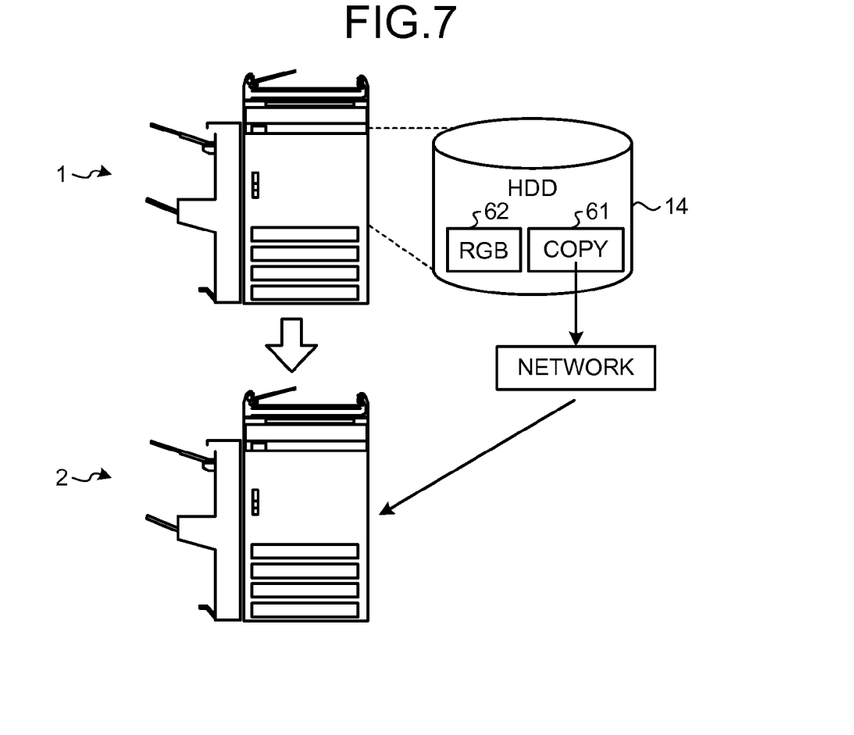
FIG. 7 is diagram illustrating a situation where image data in a copying-application-specific format is transferred without conversion to another multifunction apparatus of the same model.

Under a condition (which will be described in detail later) where the image data in the specific format can be used without a problem such as degradation (YES at Step S103), the image data in the specific format stored in the HDD 14 is to be used without conversion (see FIG. 7, for example) (Step S104). FIG. 7 illustrates a situation where image data 61 in a copying-application-specific format is transferred without conversion to another multifunction apparatus 2 of the same model.

Figure 8:
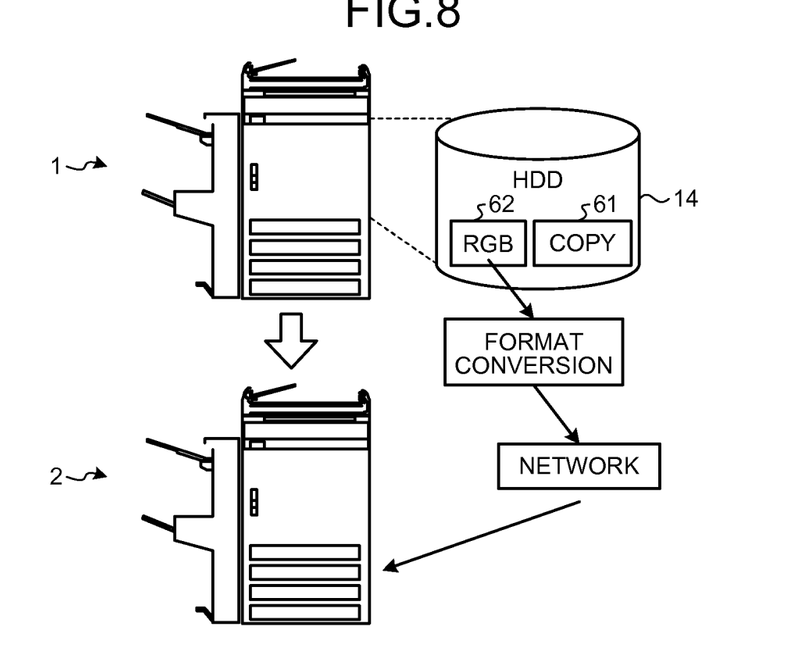
FIG. 8 is diagram illustrating a situation where image data in the universal format (RGB) is converted into image data in a particular-application-specific format and transferred to another multifunction apparatus of the same model.
Figure 9:
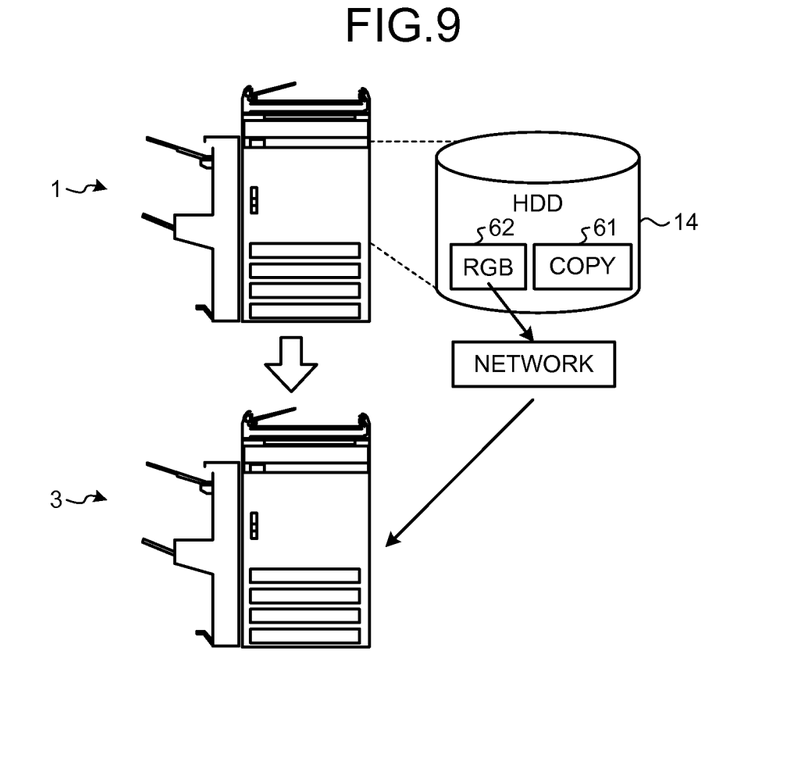
FIG. 9 is diagram illustrating a situation where image data in the universal format (RGB) is transferred without conversion to another multifunction apparatus of a different model.

On the other hand, under a condition (which will be described in detail later) where the image data in the specific format cannot be used without a problem such as degradation (NO at Step S103), the image data in the universal format is to be utilized (Step S105). The image data in the universal format is converted into the particular-application-specific format and used by the particular application in the multifunction apparatus 1, or transmitted to the other multifunction apparatus of the same model as will be described later (see FIG. 8). Transmitted to the other multifunction apparatus is the image data in the universal format without conversion (see FIG. 9) (in the latter case, the other apparatus performs conversion as required). FIG. 8 is diagram illustrating a situation where (RGB) image data 62 in the universal format is converted into image data in the particular-application-specific format and transferred to another multifunction apparatus 2 of the same model. FIG. 9 is diagram illustrating a situation where image data in the universal format (RGB) 62 is transferred without conversion to another multifunction apparatus 3 of the different model.

Meanwhile, during actual operations of the multifunction apparatus 1, a situation (read error) where the image data in the specific format cannot be read out in part or in its entirety due to deterioration of the HDD 14 or the like or a situation where the stored image data in the specific format becomes unusable due to some error can come upon. Also in such a situation, the image data in the specific format cannot be used without problem; accordingly, the image data in the universal format is to be used. When the image data is to be used by another application of the multifunction apparatus 1, the image data in the universal format stored in the HDD 14 is converted into image data in a format specific to the other application and used by the other application in the multifunction apparatus 1. When the image data is to be transmitted to another apparatus, the image data in the universal format stored in the HDD 14 is to be transmitted without conversion to the other apparatus (the other apparatus then performs format conversion as required).

Use of the image data in the universal format is prohibited in a situation (read error) where the image data in the universal format cannot be read out in part or in its entirety due to deterioration of the HDD 14 or the like or a situation where the stored image data in the universal format has become unusable due to some error. Therefore, in this case, converting the image data in the universal to a format specific to any one of the applications of the multifunction apparatus 1 and transferring the image data in the universal format to another apparatus are prohibited.

The operations in the multifunction apparatus 1 described above or processing in the multifunction apparatus 1 which will be described later is to be started and achieved by the CPU 11 of the controller 10 which serves as a control unit of the multifunction apparatus 1 by executing a corresponding program in response to a predetermined user operation performed using the operation panel 20 or the like. Examples of the user operation include accumulation and printing for storing image data and utilizing stored image data.

A primary object of the present embodiment is to prevent degradation in image quality of input image in processing performed after image input. To attain this, at image input (i.e., when image data is obtained by document scanning or received from a host such as a PC), the image data (in the universal format) which is, e.g., RGB image data, is stored, and also the image data is converted into an application-specific format (specific format) for each of the applications and stored as described above. The multifunction apparatus 1 includes the format converting unit 30 as a unit that performs this image format conversion.

Processing procedures that characterize the embodiment are described below. In the description below, image data in the RGB format is assumed as image data in the universal format; however, the universal format is not limited to the RGB format. Although an example where image input is performed by scanning a document with the scanner unit 52 is described below, image input can be performed by either scanning a document with the scanner unit 52 or receiving image data from a host such as a PC. When image input is performed by receiving image data from a host such as a PC, the image data (in the RGB format) supplied from the host to the multifunction apparatus 1 is stored in the memory 12 via the NIC 16, the ASIC 13, and the CPU 11.

Figure 10:
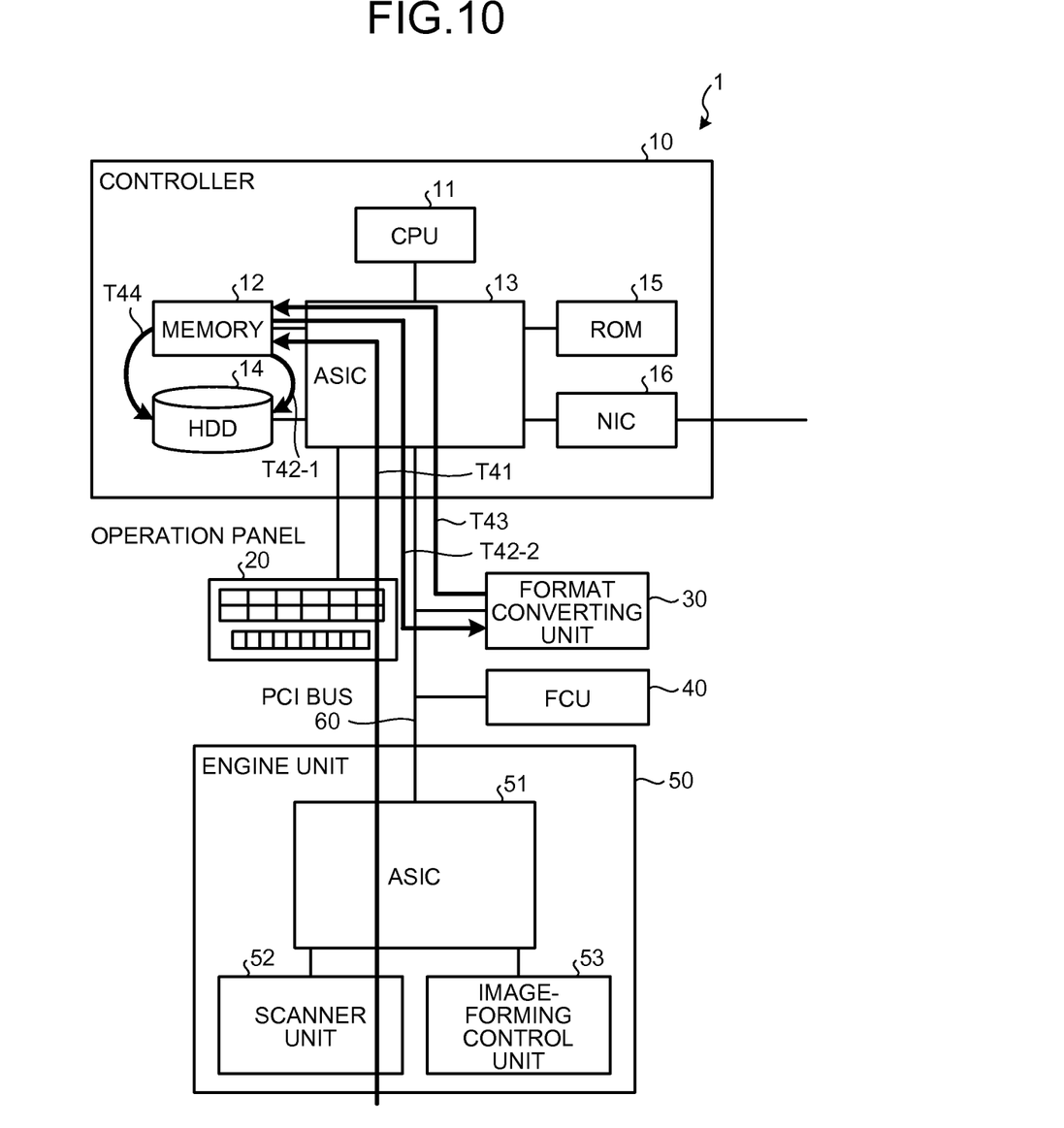
FIG. 10 is a diagram for explaining a processing procedure for storing image data obtained by scanning a document.

A processing procedure for storing image data obtained by scanning a document is described below with reference to FIG. 10.

(1) Image data in the RGB format (the universal format) obtained by the scanner unit 52 by scanning a document is input to and stored in the memory 12 via the ASIC 51 and the ASIC 13 (T41).

(2-1) The image data in the universal format input to the memory 12 is accumulated in the HDD 14 (T42-1).

(2-2) The image data in the universal format input to the memory 12 is transmitted via the ASIC 13 to the format converting unit 30. The format converting unit 30 converts the image data into image data in a format that is model-specific and application-specific for each of the applications (T42-2).

(3) The image data converted by the format converting unit 30 into the specific format is input to the memory 12 via the ASIC 13 (T43).

(4) The image data converted into the specific format and input to the memory 12 is accumulated in the HDD 14 (T44).

When the image data obtained by the scanner unit 52 by scanning the document is input, the image data in the universal format and the image data in the specific format are accumulated in the HDD 14 as described above.

Figure 11:
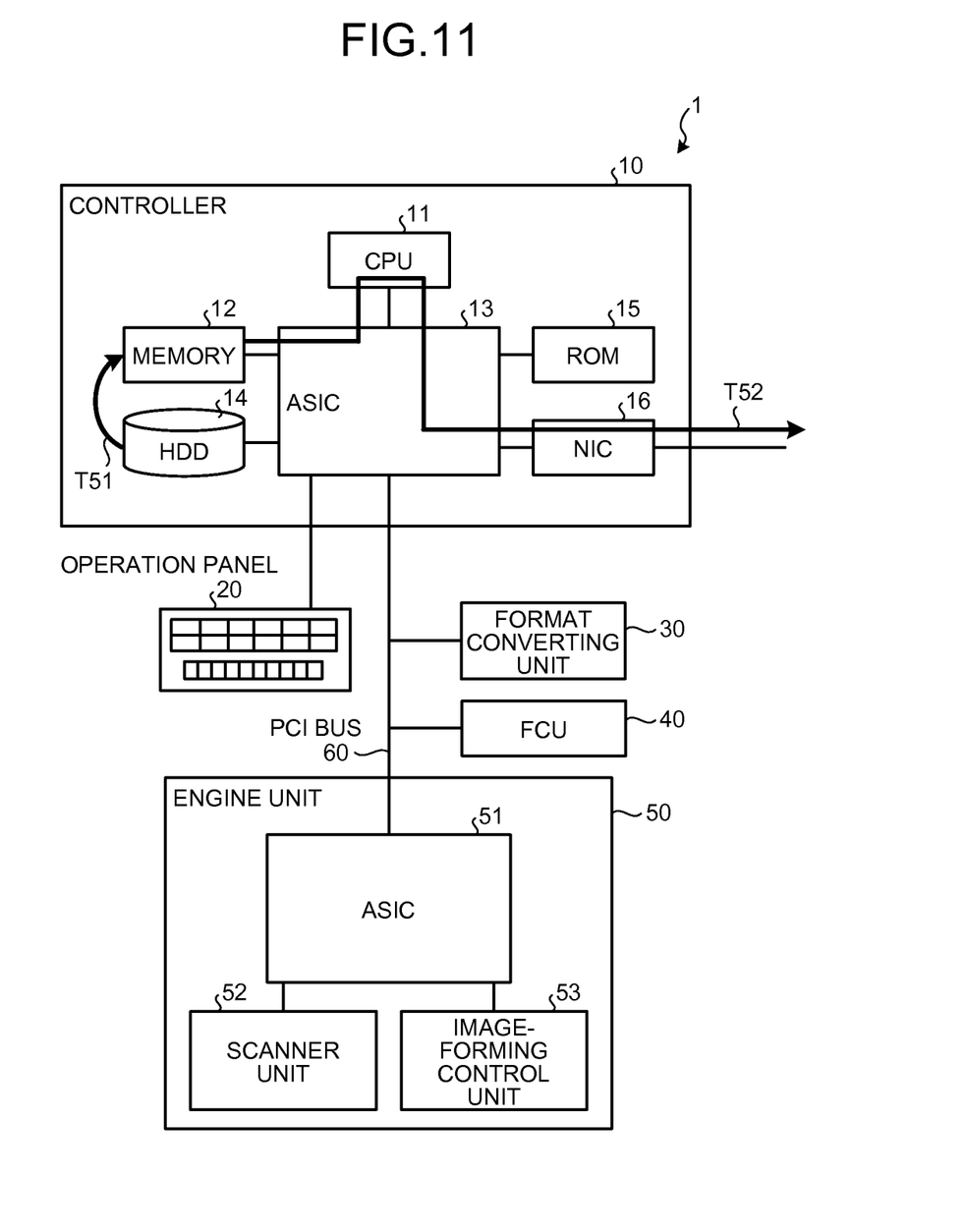
FIG. 11 is diagram for explaining a processing procedure for transferring stored image data in the universal format or stored image data in a specific format to another apparatus.

A processing procedure for transferring the stored image data in the universal format or the stored image data in the specific format to another apparatus without conversion is described below with reference to FIG. 11. It is assumed that a destination host corresponding to the other apparatus, to which the image data is to be transferred, has been designated in advance. Image data in a format (the universal format or a specific format) necessary for the destination is selected to perform this transfer.

(1) The image data stored in the HDD 14 is placed in the memory 12 (T51).

(2) The image data placed in the memory 12 is sent via the CPU 11 to the NIC 16 from which the image data is transferred to the other apparatus (T52).

Figure 12:
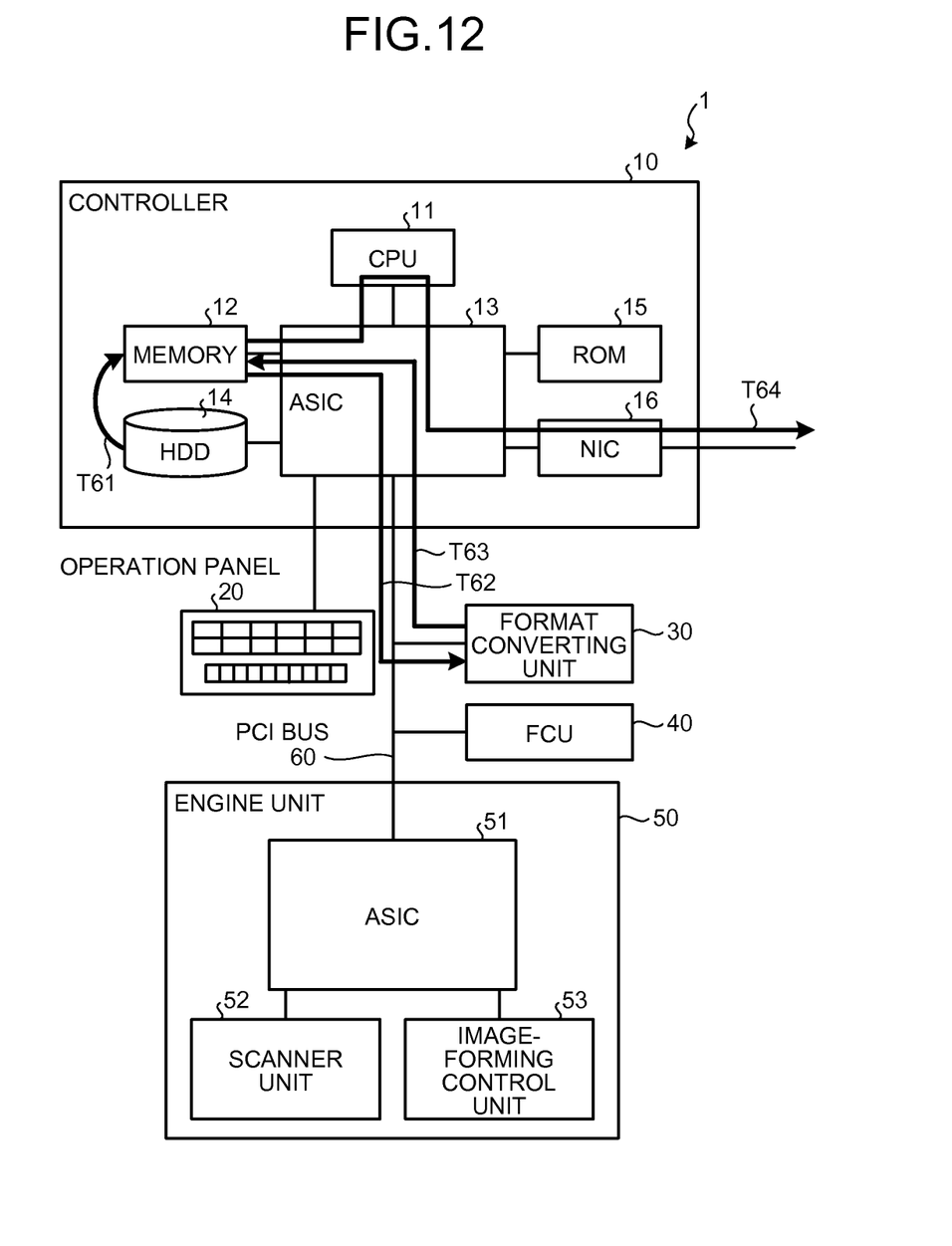
FIG. 12 is diagram for explaining a processing procedure for converting image data in the universal format stored in an HDD when scanning is performed (i.e., at image input) into a specific format and transferring the converted image data to another apparatus.

A processing procedure for converting the image data in the universal format stored in the HDD 14 when scanning is performed (i.e., at image input) into a specific format and transferring the converted image data to another apparatus is described below with reference to FIG. 12.

The procedure described below is performed under control of the CPU 11 when document scanning is started by a user that has designated a destination host, to which the image data obtained by scanning a document is to be transferred, by manipulating the operation panel 20. A part of the processing procedure until the image data obtained by scanning the document is stored in the HDD 14 is similar to the processing procedure for the scanning described above. Accordingly, a part of the processing procedure after the image data has been stored in the HDD 14 is described below.

(1) The image data obtained by scanning a document and stored in the HDD 14 is placed in the memory 12 (T61).

(2) The image data placed in the memory 12 is transmitted via the ASIC 13 to the format converting unit 30. The format converting unit 30 then converts the image data into image data in a scanner-application-specific format (T62).

(3) The image data converted by the format converting unit 30 is placed in the memory 12 via the ASIC 13 (T63).

(4) The image data placed in the memory 12 is transmitted via the CPU 11 to the NIC 16, from which the image data is transferred to the destination host (T64).

As described above, in the present embodiment, processing branches to two scenarios: one is a scenario where stored image data in the universal format or stored image data in a specific format is transferred without conversion, and the other is a scenario where the image data in the universal format is converted into image data in an application-specific format and then transferred or used. Conditions for this branching are described below.

In the description below, it is assumed that three pieces (a first MFP, a second MFP, and a third MFP) of the multifunction apparatus 1 having an application A and an application B as the applications are connected to one another over a network. The second MFP and the first MFP are of the same model, while the third MFP and the first MFP are of different models. It is also assumed that image data is transferred from the first MFP, and image data in the universal format and image data in an application-A-specific format are stored in the first MFP. Although an example where the three pieces (the first MFP, the second MFP, and the third MFP) of the multifunction apparatus 1 having the application A and the application B as the applications is described below, applications of one piece (the third MFP) of the multifunction apparatus 1 can differ from applications of the other pieces (the first and second MFPs) of the multifunction apparatus 1 that are of different models.

When image data is to be transmitted to another apparatus connected to the multifunction apparatus 1 over the network, processing is to be performed as described in a corresponding one of (e) to (f) below.

(a) When the image data is transmitted to the second MFP which is of the same model as the first MFP to be used by the application A which is the same as that of the first MFP, both the model and the application match. Thus, the image data in a format that is specific to the model of the first MFP and application-A-specific stored in the first MFP can be used without degradation. Accordingly, in this case, the image data in the format that is specific to the model of the first MFP and application-A-specific is to be transmitted to the second MFP without conversion.

(b) When the image data is transmitted to the second MFP which is of the same model as the first MFP to be used by the application B which differs from the application A, the image data in the format that is specific to the model of the first MFP and application-A-specific cannot be used without conversion. This is because the stored image data in the specific format is not for the application A but for the application B of the second MFP. Thus, the stored image data in the specific format cannot be used without degradation. Accordingly, in this case, the image data in the universal format is to be converted into a format that is specific to the model of the first MFP and application-B-specific, and the converted image data is to be transmitted to the second MFP.

(c) When the image data is transmitted to the third MFP that differs from the first MFP in model and to be used by the application A which is the same as that of the first MFP, the image data in the format that is specific to the model of the first MFP and application-A-specific cannot be used without conversion. This is because although the application A to be used in the third MFP is the same as the application (the application A) that uses the image data in the specific format stored in the first MFP, the model of the third MFP differs from that of the first MFP. Thus, the stored image data in the specific format cannot be used without degradation. The stored image data in the specific format is for the application A. However, the first MFP cannot convert an image in the universal format into a format specific to the model of the third MFP. Accordingly, in this case, the image in the universal format is transmitted to the third MFP without conversion. The third MFP converts the image data in the universal format transferred from the first MFP into the format that is specific to the model of the third MFP and application-A-specific, and uses the converted image data.

(d) When the image data is transmitted to the third MFP that differs from the first MFP in model and to be used by the application B which differs from the application A, the image data in the format that is specific to the model of the first MFP and application-A-specific cannot be used without conversion. This is because not only the model of the third MFP differs from that of the first MFP but also the image data in the specific format stored in the first MFP is not for the application B of the third MFP but for the application A. Thus, the image data cannot be used without degradation. Furthermore, the first MFP cannot convert an image in the universal format into a format that is specific to the model of the third MFP and application-B-specific. Accordingly, in this case, the image data in the universal format is to be transmitted to the third MFP without conversion. The third MFP converts the image data in the universal format transferred from the first MFP into the format that is specific to the model of the third MFP and application-B-specific, and uses the converted image data.

When stored image data is to be used by an application in the multifunction apparatus 1, processing is to be performed as described in a corresponding one of (e) to (f) below.

(e) When the image data is to be used by the application B which differs from the application A, for which the image data is stored in the specific format in the first MFP, (i.e., when the image data is to be used by another application of the multifunction apparatus 1), the stored image data in the application-A-specific format cannot be used without conversion because the application B differs from the application A. Thus, the application B cannot use this image data without degradation. Accordingly, in this case, the stored image data in the universal format is to be converted into the application-B-specific format, and the converted image data is to be used.

(f) When the image data in the application-A-specific format stored in the first MFP is to be used by the application A (i.e., when the image data is to be used by the same application of the multifunction apparatus 1), the stored image data in the application-A-specific format can be used without conversion because the image data is be used by the same application. Accordingly, in this case, the stored image data in the application-A-specific format is to be used without conversion.

Operations (processing procedures) of the multifunction apparatus 1 according to the embodiment have been described. As described above, the multifunction apparatus 1 according to the embodiment accumulates image data in the universal format, e.g., the RGB format, which is model-independent and application-independent and image data in a specific format that is model-dependent and application-dependent at image input. When the image data in the specific format can be used without conversion, the image data in the specific format is used, while when the image data cannot be used without conversion, the image data in the universal format is used (as described above in detail). This makes it possible to prevent degradation in image quality, which would otherwise be caused by multi-time image data conversion, without affecting productivity of subsequent jobs. Furthermore, this makes it possible to maintain compatibility not only among applications but also among different apparatuses of a same model, and to enhance mutual usability of image data among different apparatuses.

Although the invention has been described with respect to specific embodiments for implementing the invention, the present invention is not limited to the embodiments described above. Various modifications can be made without departing from the scope of the present invention. The processing procedures described in the embodiment are applicable to any image processing apparatus that is connectable to a network. Meanwhile, examples of the multifunction apparatus 1 described in the embodiment include MFPs each has at least two functions of a copier function, a printer function, a scanner function, and a facsimile function and that is connectable to a network.

In the description above, it is assumed that control programs (including the applications) to be executed by the CPU 11 of the controller 10 of the embodiment are installed into the ROM 15 in advance. Alternatively, the programs may be provided as being recorded in a computer-readable recording medium such as a CD-ROM, a flexible disk (FD), a CD-R, or a digital versatile disk (DVD) in an installable or executable format. Further alternatively, the programs may be placed in a computer connected to a network such as the Internet to be provided or distributed over the network such as the Internet.

According to an aspect of the present embodiments, image data in a universal format and image data in a specific format are stored at image input, and one of the image data is selectively used depending on a condition as required. Accordingly, an effect that degradation in image quality is prevented without affecting productivity of subsequent jobs is yielded.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a plurality of applications, each of the plurality of applications being configured to perform an application-specific image processing;
a storage unit configured to store image data in a first format that is independent of the model of the image processing apparatus and application-independent and image data in a second format that is dependent on the model of the image processing apparatus and application-dependent of the image data input side;
a converting unit configured to convert the image data in the first format into the image data in the second format;
a communication unit configured to exchange the image data with one or more external apparatus via a network; and
a control unit configured to provide control such that
the storage unit stores the image data in the first format and the image data converted by the converting unit into the second format at image data input, the second format being specific to one application of the plurality of applications,
when the stored image data is to be used by a first application in one of the one or more external apparatus and the one of the one or more external apparatus has a same model as the image processing apparatus, the communication unit transfers the stored image data in the second format to the one of the one or more external apparatus via the network, the first application being same as the one application,
when the stored image data is to be used by a second application in the one of the one or more external apparatus, the converting unit converts the stored image data into image data in a third format for the second application and the communication unit transfers the image data in the third format to the one of the one or more external apparatus via the network, the second application being different from the one application, and
when the one of the one or more external apparatus is of a different model from the image processing apparatus and the stored image data is to be used by an application in the one of the one or more external apparatus, the communication unit transfers the stored image data in the first format to the one of the one or more external apparatus via the network.

2. The image processing apparatus according to claim 1, wherein when the one of the one or more external apparatus is of a different model from the image processing apparatus and the stored image data is to be used by the one of the one or more external apparatus, the control unit is configured to provide control such that the communication unit transfers the stored image data in the first format to the one of the one or more external apparatus via the network.

3. The image processing apparatus according to claim 1, wherein when the stored image data is to be used by a third application in the image processing apparatus, the control unit is configured to provide control such that the converting unit converts the stored image data in the first format into the image data in the second format for the third application and the converted image data is fed to the third application, the third application being different from the one application.

4. The image processing method according to claim 1, wherein when the stored image data in the second format for the one application becomes unusable due to an error, the control unit is configured to provide control such that the image data in the first format is utilized.

5. The image processing method according to claim 1, wherein when the stored image data in the first format becomes unusable due to an error, the control unit is configured to prohibit a use of the image data in the first format.

6. An image processing method to be performed by an image processing apparatus that includes a plurality of applications each executing an image processing, the image processing method being performed on image data stored in a first format that is model-independent and application-independent and image data stored in a second format that is model-dependent and application-dependent of image data input side, the image data in the first format being converted into the image data in the second format, the image processing apparatus communicating the stored image data with one or more external apparatus via a network, the image processing method comprising:
controlling, by a control unit, such that
the image data in the first format and the image data converted by the converting unit into the second format are stored at an image data input, the second format being specific to one application of the plurality of applications,
when the stored image data is to be used by a first application in one of the one or more external apparatus and the one of the one or more external apparatus has a same model as the image processing apparatus, the stored image data in the second format is transferred to the one of the one or more external apparatus via the network, the first application being same as the one application,
when the stored image data is to be used by a second application in the one of the one or more external apparatus, the stored image data in the first format is converted into image data in a third format for the second application and the image data in the third format is transferred to the one of the one or more external apparatus via the network, the second application being different from the one application, and
when the one of the one or more external apparatus is of a different model from the image processing apparatus and the stored image data is to be used by an application in the one of the one or more external apparatus, the stored image data in the first format is transferred to the one of the one or more external apparatus via the network.

7. The image processing method according to claim 6, wherein when the one of the one or more external apparatus is of a different model from the image processing apparatus and the stored image data is to be used by the one of the one or more external apparatus, the controlling provides control such that the stored image data in the first format is transferred to the one of the one or more external apparatus via the network.

8. The image processing method according to claim 6, wherein when the stored image data is to be used by a third application in the image processing apparatus, the controlling provides control such that the stored image data in the first format is converted into the image data in the second format for the third application and the converted image data is fed to the third application, the third application being different from the one application.

9. The image processing method according to claim 6, wherein when the stored image data in the second format for the one application becomes unusable due to an error, the controlling provides control such that the image data in the first format is utilized.

10. The image processing method according to claim 6, wherein when the stored image data in the first format becomes unusable due to an error, the controlling prohibits the use of the image data in the first format.

11. A non-transitory computer-readable medium having computer readable program codes recorded thereon, the program codes configured to perform an image processing method when executed by a processor of an image processing apparatus, the image processing method being performed on image data stored in a first format that is model-independent and application-independent and image data stored in a second format that is model-dependent and application-dependent of image data input side, the image data in the first format being converted into the image data in the second format, the image processing apparatus communicating the stored image data with one or more external apparatus via a network, the image processing method comprising:

controlling, by a control unit, such that the image data in the first format and the image data converted by the converting unit into the second format are stored at an image data input, the second format being specific to one application of the plurality of applications,         when the stored image data is to be used by a first application in one of the one or more external apparatus and the one of the one or more external apparatus has a same model as the image processing apparatus, the stored image data in the second format is transferred to the one of the one or more external apparatus via the network, the first application being same as the one application,         when the stored image data is to be used by a second application in the one of the one or more external apparatus, the stored image data in the first format is converted into image data in a third format for the second application and the image data in the third format is transferred to the one of the one or more external apparatus via the network, the second application being different from the one application, and         when the one of the one or more external apparatus is of a different model from the image processing apparatus and the stored image data is to be used by an application in the one of the one or more external apparatus, the stored image data in the first format is transferred to the one of the one or more external apparatus via the network.

\* \* \* \* \*